(12) United States Patent
Boutros

(10) Patent No.: US 10,883,630 B2
(45) Date of Patent: Jan. 5, 2021

(54) SEPTIC HOSE COMPRESSOR SYSTEM

(71) Applicant: Hani Boutros, Cambria, CA (US)

(72) Inventor: Hani Boutros, Cambria, CA (US)

( * ) Notice: Subject to any disclaimer, the term of this patent is extended or adjusted under 35 U.S.C. 154(b) by 79 days.

(21) Appl. No.: 16/250,039

(22) Filed: Jan. 17, 2019

(65) Prior Publication Data

US 2019/0234537 A1  Aug. 1, 2019

Related U.S. Application Data

(60) Provisional application No. 62/622,747, filed on Jan. 26, 2018.

(51) Int. Cl.
| | | |
|---|---|---|
| *F16L 11/12* | (2006.01) | |
| *E03F 7/00* | (2006.01) | |
| *E03F 7/10* | (2006.01) | |

(52) U.S. Cl.
CPC ............... *F16L 11/12* (2013.01); *E03F 7/00* (2013.01); *E03F 7/106* (2013.01)

(58) Field of Classification Search
CPC .............. F16L 11/12; E03F 7/00; E03F 7/106
USPC .......................................................... 138/89
See application file for complete search history.

(56) References Cited

U.S. PATENT DOCUMENTS

| | | | | | |
|---|---|---|---|---|---|
| 3,811,462 A | * | 5/1974 | Feliz | .................. | E03F 1/008 137/240 |
| 4,133,347 A | * | 1/1979 | Mercer | ................... | B60R 15/00 137/240 |
| 4,554,949 A | * | 11/1985 | Sell | ..................... | F16L 37/0985 137/899 |
| 4,779,650 A | * | 10/1988 | Sargent | ................... | B60R 15/00 137/599.02 |
| 4,854,349 A | * | 8/1989 | Foreman | ................ | B60R 15/00 138/89 |
| 5,247,974 A | * | 9/1993 | Sargent | ................... | B60R 15/00 137/899 |
| 5,657,792 A | * | 8/1997 | Prest | ................... | F16L 55/1152 138/89 |
| 5,904,183 A | * | 5/1999 | Leech | ..................... | B60R 15/00 137/355.16 |
| 6,513,550 B1 | * | 2/2003 | Kwilosz | ................. | F16K 24/04 137/587 |
| 7,722,091 B1 | * | 5/2010 | Brockington | ........... | E03F 1/008 285/361 |
| 8,465,059 B1 | * | 6/2013 | Price | ....................... | F16L 27/08 285/278 |
| 2009/0236001 A1 | * | 9/2009 | Damaske | ................ | B60R 15/00 137/899 |
| 2018/0282034 A1 | * | 10/2018 | Fagone | .............. | B65D 41/0485 |

* cited by examiner

*Primary Examiner* — Craig M Schneider
*Assistant Examiner* — David R Deal

(57) ABSTRACT

A septic hose compressor is provided that is attachable to a conventional septic hose such as the hoses used in RVs. The system includes an air-tight second end cap that attaches to the second end of the septic hose. The first end cap attaches to the first end of the septic hose and includes a one-way valve or other flow restriction mechanism to allow for the removal of air from the interior of the septic hose to provide a compressed septic hose that is suitable for storage.

14 Claims, 7 Drawing Sheets

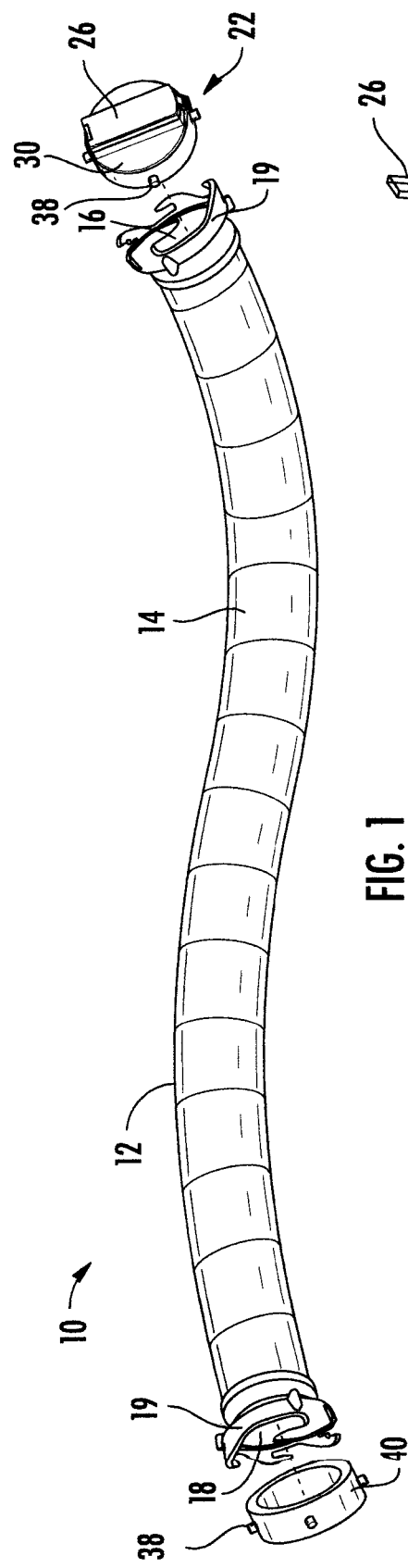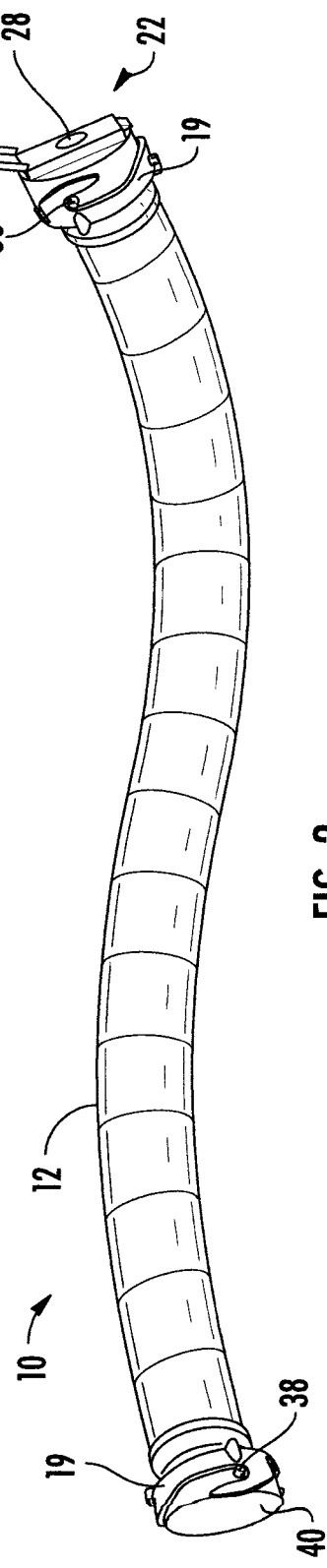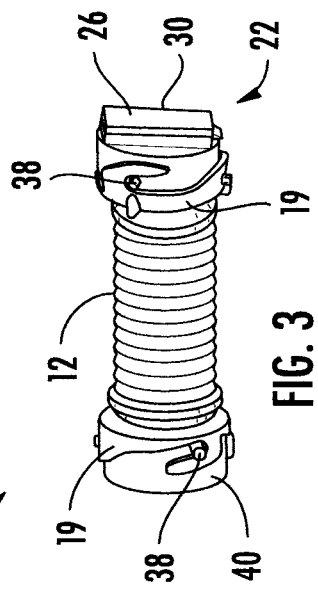
FIG. 1
FIG. 2
FIG. 3

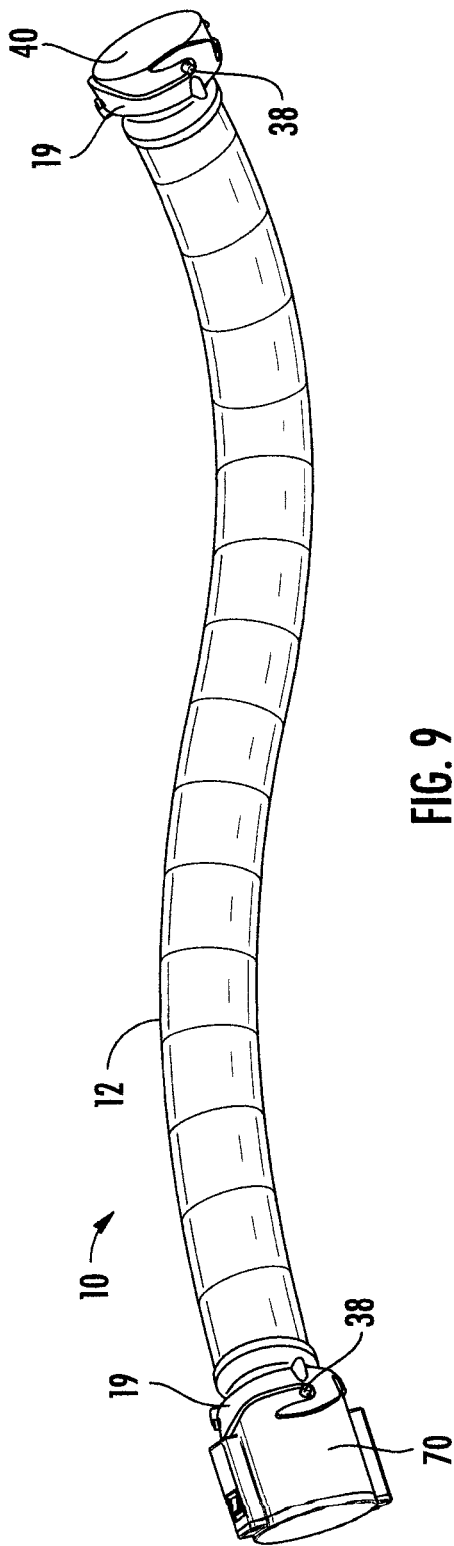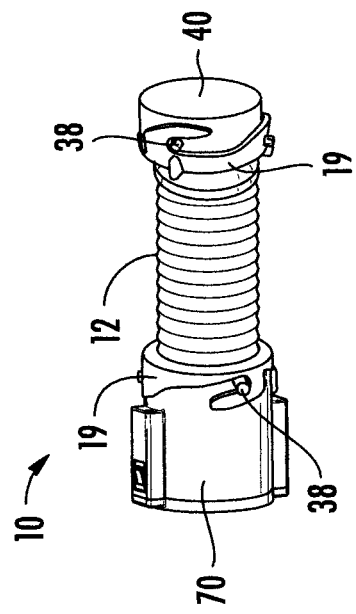
FIG. 9
FIG. 10

SEPTIC HOSE COMPRESSOR SYSTEM

BACKGROUND OF THE INVENTION

Field of the Invention

The present invention relates generally to the field of sewage systems and more specifically relates to a device for compressing or compacting septic tank hoses.

Description of the Related Art

Existing methods to evacuate a septic tank involve physically handling and storing an elongate waste evacuation hose. One end of the evacuation hose connects to a septic tank and the other end is mounted to expel the waste to a discharge site. Generally, the evacuation procedure relies on gravity to direct the waste material from the septic tank through the hose to the discharge site. Further flushing efforts of the septic tank are typically taken by pouring water into the septic tank while the channel between the septic tank and the discharge site is open. In many cases, such as mobile housing units or recreational vehicles, the evacuation hose features an accordion style compressibility function. The purpose of this functionality is for easy storage of the evacuation hose when collapsed. Manually compressing the evacuation hose after use may cause a user to come into contact with waste that has been deposited on the interior of the waste evacuation hose. Contact with this waste and water is unsanitary and may cause a user to contract an illness. A suitable solution is required.

Various attempts have been made to solve problems found in sewage system art. Among these are found in: U.S. Publication No. 2004/0031528 wherein an air pressure extendable and retractable drain pipe is disclosed. Similarly, U.S. Pat. No. 3,811,462 discloses a telescoping drain or septic line. U.S. Pat. No. 4,133,347 discloses a septic hose that includes an end cap that is threadedly connectable to a further housing to compress the septic hose therebetween. U.S. Publication No. 2007/0295420 discloses a septic hose having a handle thereon and extends and retracts the hose by increasing or decreasing the pressure in the hose. U.S. Publication No. 2014/0150889 discloses a septic hose having an extendable and retractable pressure hose for the transfer of pressurized fluids. U.S. Pat. No. 4,854,349 discloses a self-contained sewage drainage unit having a dual closure cap. WIPO Publication No. 2011064808 discloses a machine for extending or retracting an extendable corrugated hose. U.S. Pat. No. 5,023,959 discloses a crank driven hose extender for an RV using a specialized hose extender and retractor system. U.S. Publication No. 2004/0031528 discloses a vehicle-based hose retraction and extension system. The prior art is representative of sewage systems and illustrates the need and desire for an improved septic hose compression and storage system.

None of the above inventions and patents, taken either singly or in combination, is seen to describe the invention as claimed. Thus, a need exists for a reliable septic hose compressor or compactor system, and to avoid the above-mentioned problems related to manipulation of the septic hose and exposure to waste products.

BRIEF SUMMARY OF THE INVENTION

The present disclosure teaches a septic hose compressor system that advantageously fills the deficiencies of the prior art. The septic hose compressor system is superior to others in that it effectively provides an effective means of compacting a septic hose.

The present invention relates to a septic hose compressor system that is used to compress a septic hose that is used for camping and other recreational purposes. These hoses are generally found with recreational vehicles and similar camping accommodations that have a sewage tank. The hoses that connect to the sewage tank may be accordion-style hoses. A typical feature of an accordion-style hose may be its ability to collapse. Ideally these hoses have two states, an extended state, and a collapsed state. Typically, these hoses are 10 feet or longer in the extended state. With the present invention, a 10-foot septic hose is preferably compressed to about 4 feet or less. A spring force may exist in the hose due to its method of manufacturing that may cause an intermediate state between being fully extended and fully collapsed. When the hose is in the intermediate state, due to the residual spring force, the hose may be difficult for an average user to manage for storage or cleaning. Between uses the hose needs to be stored in the collapsed state and is placed in a storage compartment in the camper or RV. Converting from one state to another state requires the evacuation of air within the volume of the hose.

The present invention may evacuate the air within the hose by utilizing a mechanical device or a compact air pump mechanism. A second, preferably air tight end cap may be placed on the second end of the sewage hose, thereby restricting air from passing through the second end. A first end cap may be placed on the other end or first end of the hose. The first end cap may be configured to remove air from the interior of the hose, thereby allowing for the collapse of the accordion style sewage hose. This device provides a sanitary hands-free method of collapsing the septic hose. The invention describes embodiments for the manual or automated compression of the accordion style septic hose. In this invention, the system may comprise two end-caps, each configured to mate with a conventional septic hose adapter preferably having conventional spoke slots. At least one of the two end-caps includes a valve configured to allow the passage of a volume of gas from the interior of the septic hose. The user may attach the end-caps to a non-collapsed accordion style septic hose. The user may then manually collapse the accordion style septic hose allowing the interior volume of gas pass through the valve. The preferred form of the valve of the present invention, may include a flap valve which is manually or automatically closed, a one-way valve or an automated valve that withdraws air from the septic hose.

The features of the invention are described in further detail below in the Detailed Description of the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will convey the scope of the invention to those skilled in the art as defined in the claims.

BRIEF DESCRIPTION OF THE DRAWINGS

The figures which accompany the written portion of this specification illustrate embodiments and method(s) of use for the present invention; a septic hose compressor system. constructed and operative according to the teachings of the present invention.

FIG. 1 is a front perspective view of a hands-free mechanical septic hose compressor system showing the septic hose compressor according to an embodiment of the present invention.

FIG. 2 is a front perspective view illustrating the septic hose compressor system showing the ends of the hands-free mechanical septic hose compressor system attached to a septic hose according to an embodiment of the present invention.

FIG. 3 is a front perspective view illustrating the septic hose compressor system shown in FIG. 2 with the end caps attached to the septic hose and the septic hose in the compressed configuration.

FIG. 9 is a front perspective view illustrating the septic hose compressor system showing the ends of the powered air removal system attached to a septic hose according to the embodiment shown in FIG. 7 of the present invention.

FIG. 10 is a front perspective view illustrating the septic hose compressor system shown in FIG. 9 with the end caps attached to the septic hose and the septic hose in the compressed configuration.

The various embodiments of the present invention will hereinafter be described in conjunction with the appended drawings, wherein like designations denote like elements.

DETAILED DESCRIPTION

Figure 4:
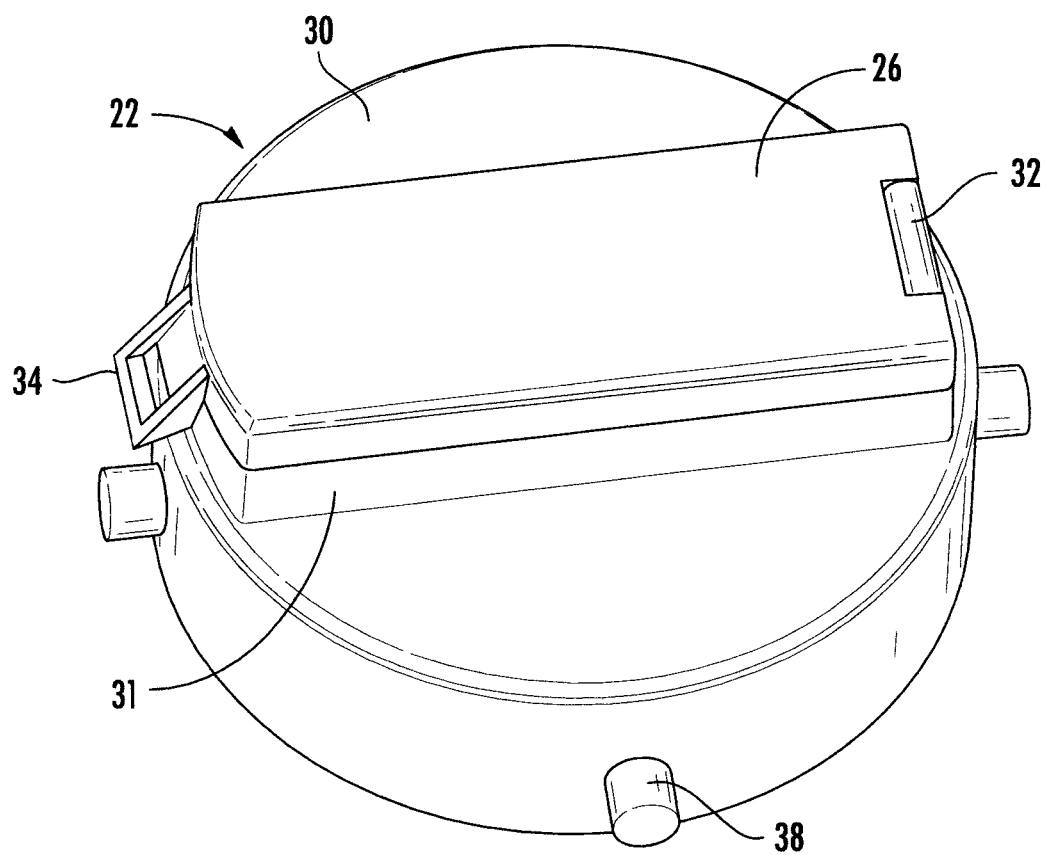
FIG. 4 is a perspective view illustrating the first end cap of the septic hose compressor system showing the flap member on the first end cap according to an embodiment of the present invention.

The present invention is directed to a septic hose compressor or compacting system. The system of the present invention generally includes a conventional septic hose with a first end cap and a second end cap. The disclosed invention includes a first end cap modified to facilitate the removal of air from the interior of the septic hose and a second end cap which is configured to provide an air tight seal on the second end of the septic hose.

In one embodiment of the present invention, the septic hose compressor system 10 may comprise a system to remove air from a septic hose 12. The septic hose consists generally of an elongate flexible hose member 14 having a first end 16 and a second end 18 thereon. The conventional septic hose may be configured with an accordion-style outer body wherein the hose length may decrease along its axis. As an example, the standard septic hose may be approximately 10 feet in length in the extended configuration and about 3 or 4 feet in the compressed configuration. Each of the first and second ends, 16 and 18, have standard septic spoke slots 19 thereon.

The septic hose compressor system 10 may generally comprise an air removal mechanism which is preferably associated with a first end cap 22 and a second end cap 40 that is preferably a generic standard end cap that closes the second end 18 of the septic hose 12. The first end cap 22 is configured to mate with an end of the standard septic spoke slots 19 and provide an air tight connection therebetween. The second end cap 40 is also configured to mate with a standard septic spoke slots 19 to provide an air tight connection therebetween. When the functionality of the first end cap 22 is activated, the air from the interior of the septic hose 12 is removed and the overall length of the septic hose is reduced by more than approximately 50 percent and more preferably greater than 60 percent. The second end cap 40 is preferably an air tight connector that is attached to the other end of the septic hose 12 to restrict the passage of air therethrough, thereby defining a finite volume of air for the septic hose compressor system 10 to draw out of the septic hose 12. The second end cap 40 preferably includes a plurality of external extensions 38 that are sized to conform to the conventional spoke slots 19 located on the second end 18 of the septic hose. The second end cap 40 also preferably includes one or more surfaces to allow the user to grasp the second end cap 40 for attaching or removing the second end cap 40 from the second end 18 of the septic hose 12. Alternately, the second end cap 40 may include an air flow restriction device similar to those described in detail below with the first end cap 22, 50 or 70.

Figure 5:
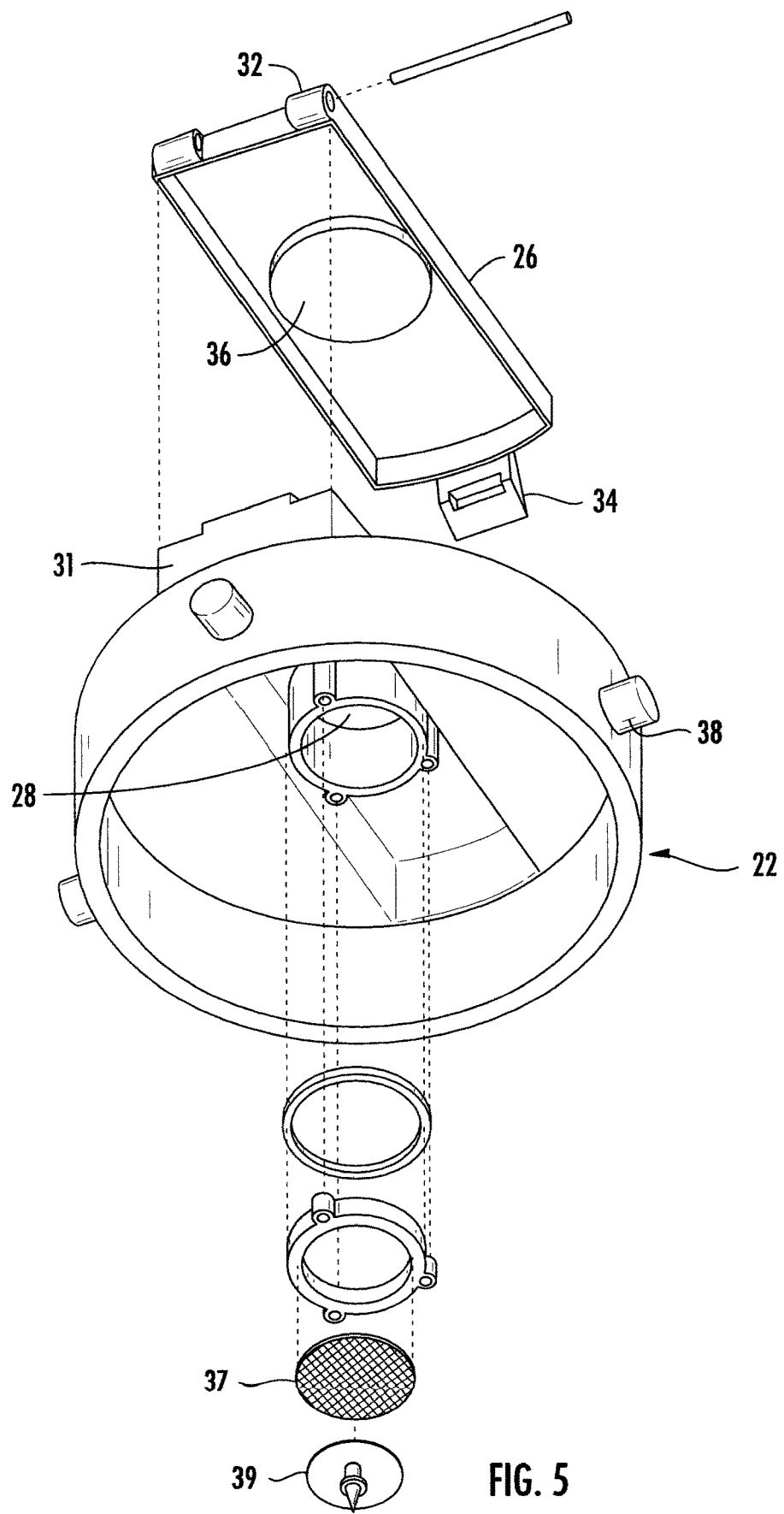
FIG. 5 is an exploded perspective view of the first end cap shown in FIG. 4.
Figure 6:
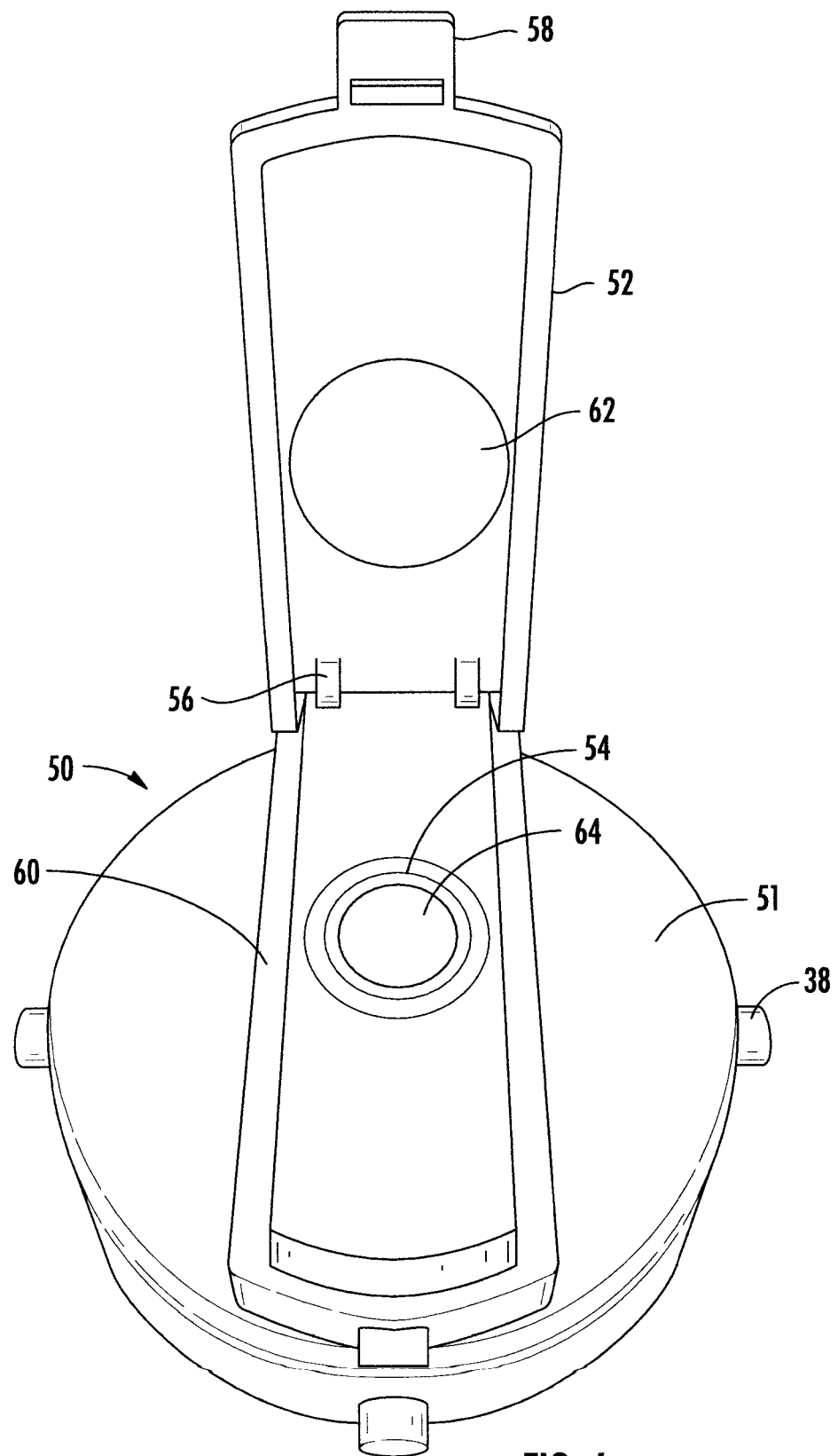
FIG. 6 is a perspective view of an alternate embodiment of the first end cap of the septic hose system of the present invention.

As shown in FIGS. 4-6, the first end cap 22 is a generally cylindrical member having a forward end having external spokes 38 that are sized and configured to mate with the spoke slots 38 on the exterior of the first end 16 of the septic hose 12. The first end cap 22 is preferably made of a durable plastic such as an ABS material or a metal. The rear end of the first end cap 22 preferably includes a flap member 26 that is openable and closable along the top surface 30 of the first end cap 22. The flap member 26 is preferably made of a durable material such as a plastic and is movable between an open position wherein air is allowed to pass through a passageway 28 in the first end cap 22 and a closed position wherein the flap member provides an airtight seal to prevent the passage of air through the passageway 28. As shown, one end of the flap member 26 includes a hinge portion 32 that allows the flap member 26 to be movable between the open and closed positions. In this embodiment, the width of the flap member is maintained constant from the hinge portion 32 to a spaced apart closure member 34. The closure member 34 preferably provides a snap fit or otherwise secure closure to maintain the flap member 26 in the closed position.

In the preferred form of this embodiment, the flap member 26 engages and preferably surrounds a raised surface on the top surface 30 of the first end cap 22 to provide a secure, air and fluid tight seal. To further prevent the flow of fluids from the interior of the septic hose 12, the interior of the flap member 26 includes a preferably compressible or flexible disc 36 to securely seal the passageway 28. The exterior surface of the flap member 26 further provides a raised surface 31 as compared to the top surface 30 of the first end cap 22 to allow the user grasp and rotate the first end cap 22 for threading or unthreading the first end cap 22 onto the septic hose 12. Finally, the exterior circular surface of the first end cap includes a plurality of extensions 38 thereon to further facilitate the threading or unthreading of the first end cap 22 from the spoke slots 19 on the first end 16 of the septic hose 12.

The passageway 28 of the embodiment shown in FIGS. 4 and 5 is shown with a one-way valve 39 which is retained in position by one or more O-rings. Alternately, the passageway 28 may be open to the interior of the first end cap 22 and septic hose 12. Additionally, the passageway may also include a screen filter 37 to prevent the passage of fluids or solids therethrough. In the preferred form of this embodiment, the screen member 37 and one-way valve 39 are provided as shown in the drawings. When the flap member 26 is in the open position, the disc 36 is spaced apart from the passageway 28 and the one-way valve 39. When the flap member 26 is in the closed position, the disc 36 abuts against the passageway 28 and one-way valve 39 to further prevent the flow of air or fluids therethrough and the closure member 34 securely retains the flap member 26 in the closed position.

In use, once the septic hose is disconnected and cleaned, the second end cap 40 is threadedly attached to the spoke slots 19 on the second end 18 of the flexible hose member 14. This provides an air tight seal at the second end 18 of the septic hose 12. Next, the first end cap 22 is threadedly attached to the first end 16 of the septic hose 12. Once the user is sure that the first end cap 22 and the second end cap are securely attached to the spoke slots 19 of the septic hose 12, the flap member 26 is moved to the open position. In this embodiment, the user may then compress or compact the flexible hose member 14. Compression of the hose member causes the air to pass through the one-way valve 39 and passageway 28 to be removed from the interior of the septic hose 12. When the septic hose 12 reaches the desired compressed length, the user may move the flap member 26 to the closed position as shown in FIG. 3 and FIG. 4. Movement of the flap member 26 to the closed position prevents the return of air into the interior of the septic hose 12 and maintains the compressed configuration until the user desires to extend the septic hose 12 for later use. As an example, when the typical RV septic hose 12 is in the extended position, it may be approximately 10-feet in length. When the septic hose 12 is in the compressed state, the preferred length is approximately 3 or 4 feet long. Similarly, if the septic hose is 20 feet long, the compressed state of the septic hose 12 may be about 5 to 8 feet long. The compressed septic hose then conveniently fits into the septic hose storage area located on typical RVs.

As shown in FIG. 6, a modified first end cap 50 is a generally cylindrical member having a forward end with external spokes 38 that are sized and configured to mate with the conventional spoke slots 19 on the exterior of the first end 16 of the septic hose 12. The first end cap 50 is preferably made of a durable plastic such as an ABS material or a metal. The top surface of the first end cap 50 preferably includes a flap member 52 that is openable and closable along the top surface 51 of the first end cap 50. The flap member 52 is preferably made of a durable material such as a plastic and is movable between an open position wherein air is allowed to pass through a passageway 54 in the first end cap 50 and a closed position wherein the flap member provides an airtight seal to prevent the passage of air through the passageway 54. As shown, one end of the flap member 52 includes a hinge portion 56 that allows the flap member 52 to be movable between the open and closed positions. In this embodiment, the width of the flap member 52 increases from the hinge portion 56 to a location adjacent to the closure member 58 to provide a more secure and durable closure. The closure member 58 preferably provides a snap fit or otherwise secure closure to maintain the flap member 52 in the closed position.

In the preferred form of this embodiment, the flap member 52 engages and preferably surrounds a raised surface 60 on the top surface 51 of the first end cap 50 to provide a secure, air and fluid tight seal. To further prevent the flow of fluids from the interior of the septic hose 12, the interior of the flap member 52 preferably includes an optional flexible disc 62 made of compressible material such as rubber or foam to securely seal the passageway 54. The exterior surface of the flap member 52 further provides the raised surface 60 as compared to the top surface 51 of the first end cap 50 to allow the user grasp and rotate the first end cap 50 for threading or unthreading the first end cap 50 onto the septic hose 12. Finally, the exterior circular surface of the first end cap includes a plurality of extensions 38 thereon to further facilitate the threading or unthreading of the first end cap 50 from the spoke slots 19 of the first end 16 of the septic hose 12. The passageway 54 of the embodiment shown in FIG. 6 is shown with a one-way valve 64 which is retained in position by one or more O-rings (not shown). The one-way valve 64 of this embodiment is preferably made of a rubber or flexible plastic material that is repeatedly openable and closable and readily cleanable. When the flap member 52 is in the open position, the flexible disc 62 is spaced apart from the passageway 54 and the one-way valve 64. When the flap member 52 is in the closed position, the flexible disc 62 abuts and is compressed against the passageway 54 and one-way valve 64 to further prevent the flow of air or fluids therethrough and the closure member securely retains the flap member 52 in the closed position.

Figure 7:
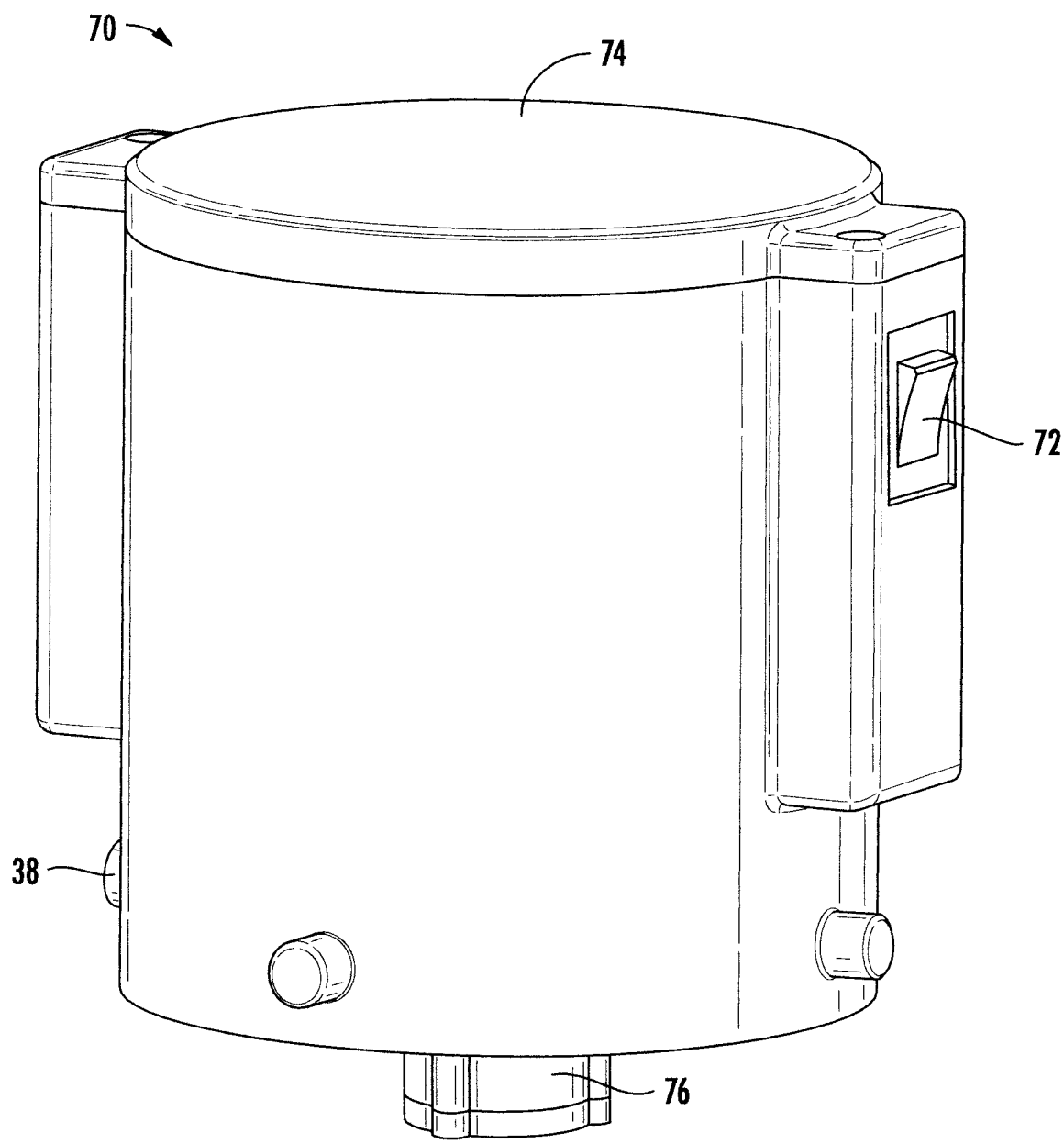
FIG. 7 is a side view of an automated first end cap of an alternate embodiment of the septic hose system of the present invention.
Figure 8:
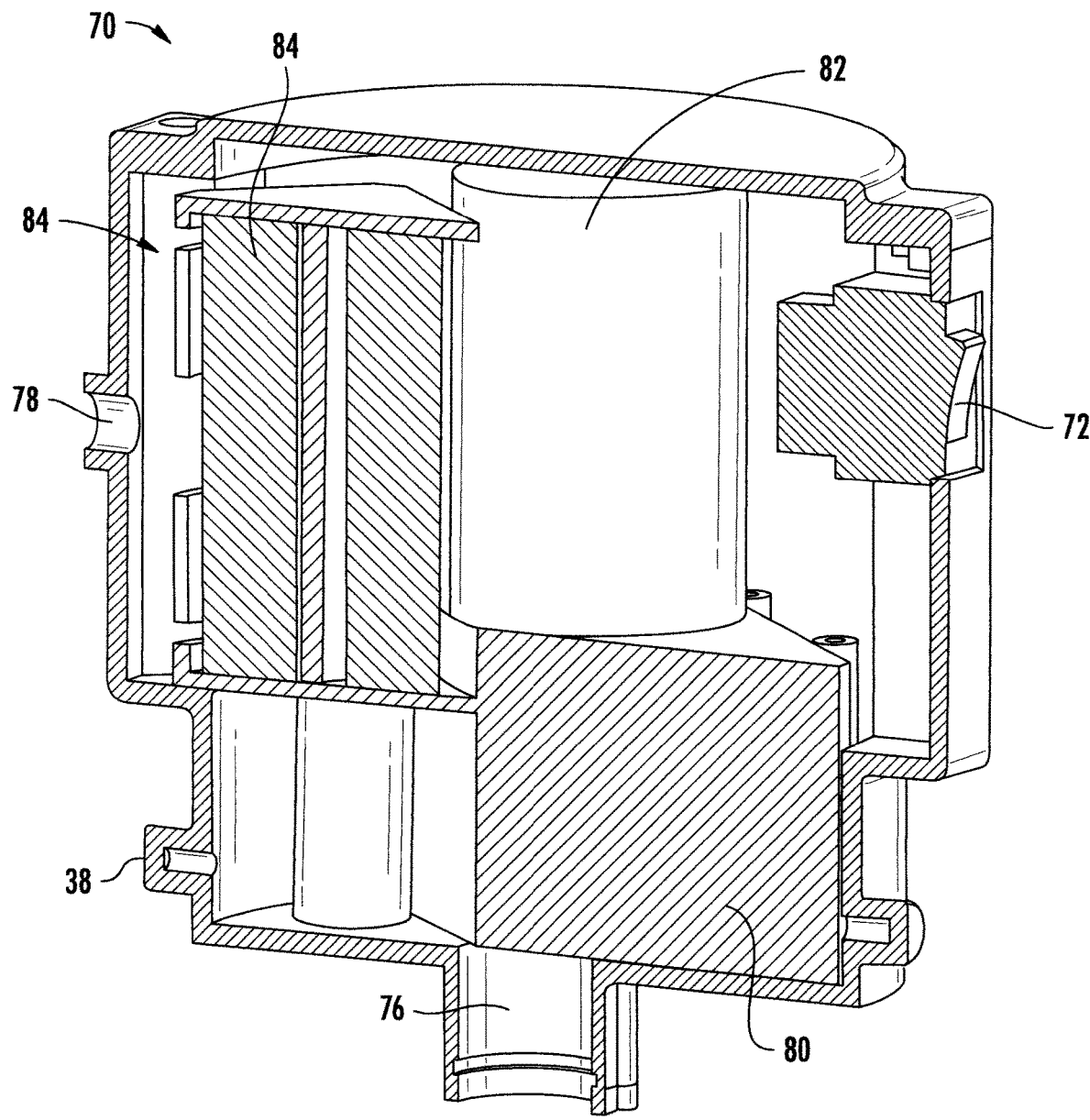
FIG. 8 is a side cross sectional view of the automated first end cap of the embodiment shown in FIG. 7.

FIGS. 7-10 are illustrative of an alternate embodiment of the present invention. As shown, the first end cap 70 of the present embodiment is preferably a self-contained and automated pressure or powered air removal device to remove the air from the interior of the septic hose 12 by pressing an on/off button 72. As shown in FIG. 7, the first end cap 70 includes a top surface 74 that provides access to the interior of the first end cap 70. The bottom surface of the first end cap 70 includes an air intake opening 76 that may include a one-way valve (not shown) or screen member (not shown) as described above. The side surface of the first end cap 70 includes an air outlet 78 to allow the air from inside the septic hose 12 to pass therethrough when the first end cap 70 is activated and extensions 38. As described above with respect to the prior embodiments and shown in FIGS. 9 and 10, the extensions 38 are securely retained in the conventional spoke slots 19 of the septic hose. As shown in FIG. 8, the interior of the first end cap 70 includes an impeller 80 or other rotary member that is activated and rotates to remove air from the septic hose 12. The impeller 80 is connected to a motor 82 that causes the impeller to rotate when the motor is activated. Adjacent to the motor is a battery housing 84 to provide a power source for the first end cap 70. The present embodiment may include standard or rechargeable batteries. Alternately, the power for the first end cap 70 may be supplied by a cord (not shown) that is plugged into a power source (not shown).

When the second end cap 40 is attached to spoke slots 19 on the second end 18 of the septic hose 12, activation of the on/off switch 72 on the first end cap 70 may withdraw the air from the septic hose to retract the accordion style sewage hose into a fully collapsed position for storage and portability. When the one/off switch 72 is activated, the power source such as the batteries the battery housing 84 energize the motor 82 to rotate the impeller 80. Rotation of the impeller 80 causes the air in the interior of the septic hose 12 to be drawn through the air inlet 76 and to the air outlet 78. In this embodiment, a self-contained and battery operated first end cap 70 is provided to facilitate the preparation of the septic hose 18 for storage.

The exact specifications. materials used, and method of use of the septic hose compressor system 10 of the present invention may vary upon manufacturing. The foregoing descriptions of specific embodiments of the present invention have been presented for purposes of illustration and description. Further forms of the present invention may include an air removal device of the type described in FIGS. 7-10 that is attachable to the first end cap to provide a separate powered air removal device that is usable with the mechanical embodiments described above and shown in FIGS. 1-6. Finally, a separate non-powered air pump may be used. The non-powered air pump may be similar in operation to a bicycle pump. These descriptions are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

What is claimed is new and desired to be protected by Letters Patent is set forth in the appended claim(s):

1. A septic hose compression system comprising an elongate septic hose having a first end and a second end and wherein the septic hose is compressible between first and second lengths and includes an interior and an exterior surface;
    a second end cap attachable to the second end of the septic hose;
    a first end cap attachable to the first end of the septic hose and wherein the first end cap includes one-way valve to restrict the flow of air through the septic hose.

2. The septic hose compression system of claim 1 wherein the air is removable from the interior of the septic hose in the first position of a flap member and the flow of air through the air flow passageway is prevented in the second position of the flap member.

3. The septic hose compression system of claim 1 wherein the air flow passageway includes a screen therein to prevent the flow of waste material therethrough.

4. The septic hose compression system of claim 1 wherein the second end cap prevents the flow of air therethrough and the first end cap selectively allows the flow of air through an air flow passageway therein.

5. A septic hose compression. system comprising
    an elongate septic hose having a first end and a second end and wherein the septic hose is compressible between first and second lengths and includes an interior and an exterior surface;
    a second end cap attachable to the second end of the septic hose;
    a first end cap attachable to the first end of the septic hose and wherein the first end cap includes an air flow removal mechanism to allow for the flow of air from the interior of the septic hose; and
    wherein the first end cap includes a flap member thereon and the flap member is movable between first and second positions wherein the flow of air through the air flow passageway is allowed in the first position of the flap member and prevented in the second position of the flap member.

6. The septic hose compression system of claim 5 wherein the air flow passageway includes a one-way valve therein to prevent the flow of air into the interior of the septic hose.

7. A septic hose compression system comprising
    an elongate septic hose having a first end and a second end and wherein the septic hose is compressible between first and second lengths and includes an interior and an exterior surface;
    a second end cap attachable to the second end of the septic hose;
    a first end cap attachable to the first end of the septic hose and wherein the first end cap includes an air flow removal mechanism to allow for the flow of air from the interior of the septic hose; and
    wherein the first end cap includes an air flow removal device having an on/off switch and a powered impeller to withdraw air from the interior of the septic hose.

8. A septic hose compression system comprising
    an elongate septic hose having a first end and a second end and wherein the septic hose is compressible between first and second lengths and includes an interior and an exterior surface;
    a second end cap attachable to the second end of the septic hose;
    a first end cap attachable to the first end of the septic hose and wherein the first end cap includes a one way valve to restrict the flow of air in at least one direction in the septic hose.

9. The septic hose compression system of claim 8 wherein the flow of air through the interior of the septic hose is restricted by a flap member which is movable between open and closed positions.

10. The septic hose compression system of claim 8 wherein the air in the septic hose is removed by a powered air flow removal device.

11. A method of removing air from a septic hose including the steps of;
    providing a flexible septic hose having first and second ends and an expanded state and a compressed state,
    providing a second end cap which is attached to the second end of the septic hose to prevent the flow of air therethrough,
    providing a first end cap wherein air is allowed to selectively flow therethrough to remove air from the septic hose to move the septic hose from the expanded state to the compressed state and wherein the first end cap includes a one-way valve therein to prevent the flow of air into the septic hose when the septic hose is in the compressed state.

12. The method of claim 11 wherein the first end cap includes a flap member that is movable between open and closed positions wherein the air in the septic hose is removable therefrom when the flap member is in the open position and prevented when the flap member is in the closed position to move the septic hose from the expanded state to the compressed state.

13. The method of claim 11 wherein the first end cap includes a powered air flow device wherein air is removed from the septic hose when the air flow device is turned on and prevented when the air flow device is turned off to move the septic hose from the expanded state to the closed state.

14. An end cap for use on a septic hose -wherein the end cap comprises
    a generally cylindrical body portion having top and bottom surfaces and an interior and exterior,
    an air flow passageway located on and extending through the interior surface of the body, the air flow passageway further including a one way valve therein and wherein the one-way is oriented to allow the flow of air from the septic hose while preventing flow of air into the septic hose, a flap member on the top surface of the body wherein the flap member is movable between first and second positions wherein the flow air through the air flow passageway is allowed in the first position thereof and prevented in the second position of the flap member, and a plurality of extensions on the exterior of the body wherein the extensions are sized and shaped to engage conventional slots located on the end portions of a septic hose.

* * * * *